United States Patent
Lipson

(10) Patent No.: US 7,760,872 B2
(45) Date of Patent: Jul. 20, 2010

(54) PUBLIC KEY CRYPTOGRAPHIC METHODS AND SYSTEMS

(75) Inventor: Jesse D. Lipson, 2701-106 Glenwood Gardens Ln., Raleigh, NC (US) 27608

(73) Assignee: Jesse D. Lipson, Raleigh, NC (US)

( * ) Notice: Subject to any disclaimer, the term of this patent is extended or adjusted under 35 U.S.C. 154(b) by 1493 days.

(21) Appl. No.: 11/027,148

(22) Filed: Dec. 30, 2004

(65) Prior Publication Data

US 2005/0220300 A1 Oct. 6, 2005

Related U.S. Application Data

(63) Continuation-in-part of application No. 10/814,726, filed on Mar. 31, 2004, now abandoned.

(51) Int. Cl.
*H04L 9/00* (2006.01)

(52) U.S. Cl. .............................. 380/30; 380/28; 380/46; 380/277; 713/168; 713/170; 726/2

(58) Field of Classification Search .................. 380/30, 380/277, 264, 283, 28, 46; 713/168, 170; 726/2

See application file for complete search history.

(56) References Cited

U.S. PATENT DOCUMENTS

| | | | | |
|---|---|---|---|---|
| 4,218,582 A | * | 8/1980 | Hellman et al. | 380/30 |
| 4,227,253 A | * | 10/1980 | Ehrsam et al. | 380/45 |
| 4,405,829 A | | 9/1983 | Rivest et al. | |
| 5,604,801 A | * | 2/1997 | Dolan et al. | 713/159 |
| 7,103,185 B1 | * | 9/2006 | Srivastava et al. | 380/277 |

OTHER PUBLICATIONS

Kaliski, RSA Digital Signature Scheme, RSA Laboratories, Revised Apr. 26, 2004.
Takagi, Efficiency Comparison of Several RSA Variants, Studienarbeit, WS 2002/2003.

* cited by examiner

*Primary Examiner*—Thanhnga B Truong
(74) *Attorney, Agent, or Firm*—Triangle Patents

(57) ABSTRACT

Systems and methods are disclosed for establishing secure communications to a group rather than to an individual recipient. The systems and methods presented include mechanisms for encryption to a group, decryption by one or more group members, digital signature generation and verification, and the addition/removal of group members.

24 Claims, 4 Drawing Sheets

PUBLIC KEY CRYPTOGRAPHIC METHODS AND SYSTEMS

This nonprovisional utility patent application claims the benefit of one or more prior filed applications; the present application is a Continuation-In-Part of application Ser. No. 10/814,726 filed Mar. 31, 2004 now abandoned, which is incorporated herein by reference in its entirety.

BACKGROUND OF THE INVENTION

1. Field of the Invention

The present invention relates generally to cryptography and, more particularly, to public key cryptographic systems such as RSA.

2. Description of the Prior Art

With the enormous volume of data that is transmitted electronically throughout the world, methods for securing the privacy of that data are crucial to the economy. Before the 1970s, senders and recipients would need to agree on some sort of secret key in order to encrypt messages such that they could not be deciphered by unauthorized third parties but could still be read by the intended recipient. This sort of symmetric cryptography alone is inconvenient in the Internet age, where it is not always easy to arrange a meeting to exchange a secret password that will allow for future secure communications. Fortunately, public key cryptography was developed in the last few decades by Diffie, Hellman, Rivest, Shamir, and Adelman, among others.

Public key cryptography allows for the secure exchange of information between senders and recipients without the necessity that the two parties first exchange a secret key. The recipient simply makes his public key available, which can be used by anyone to encrypt a message to him. Once a message is encrypted using the recipient's public key, only the private key can be used to restore the message to its original state. Only the recipient knows his private key, so messages encrypted with the public key are secure.

The standard methods for public key cryptography were developed by Rivest, Shamir, and Adelman (RSA), described in U.S. Pat. No. 4,405,829. RSA and its variants provide for encryption of data using a public key and decryption using a private key.

RSA security has been publicly and commercially used for communicating or transmitting information, data, documents, messages, and files. However, the basic RSA model is designed for communication between one party and another. There is no notion of communication between one party and a group, such as a company. Under the current RSA model, the group would need to share its private key with all members of the group. This kind of "secret sharing" harkens back to the days of symmetric encryption, which RSA was designed to avoid. In the current environment of global collaboration, a method for group communication based on RSA public key cryptography is needed.

Before explaining the current invention, it is useful to describe the current single-party RSA system.

Single-Party RSA

RSA consists of three steps: key generation, encryption, and decryption.

Key Generation

Key generation starts by deciding on an adequate length for what is called the public modulus N. This choice is dictated by the difficulty of factoring N into its prime factors. Right now, N of length 1024 bits is considered a sufficient size to prevent factoring. The bit length of N will continue to go up in the future. Next, two random prime numbers that are each half the length of N, p and q, are generated. Next, a small odd integer, e, is selected such that e is relatively prime to lcm(p−1, q−1). In practice, e is usually chosen to be 65537. In this paper, we will refer to e as the public exponent and N as the public modulus. The RSA public key consists of the two integers (e, N).

The private exponent, d, is a multiplicative inverse of e(mod lcm(p−1, q−1)), so that e*d=1 mod (lcm(p−1, q−1)). Often, the private key refers to the set of numbers (p, q, d), so d should be referred to as the private exponent rather than as the private key.

Encryption

To encrypt message X using an RSA public key {e, N}, one must first convert X into an integer M using a formatting operation. Encryption of M into ciphertext C is then accomplished by calculating C as the remainder after N is divided into M taken to the power of e. In equation form, $C=M^e \mod N$ where M is an integer greater than −1 and less than N, $0 \leq M < N$.

Decryption

To decrypt using the original implementation of RSA, M is obtained by calculating the remainder after N is divided into C taken to the power of d.

In equation form, $M=C^d \mod N$. M is then converted back to X by reversing the same formatting operation that was used to obtain M from X originally.

In prior art, secure communication to a group required that members of the group (directly or indirectly) retain a "shared secret" with the group. This secret could be a group private key that all members shared, or it could be a symmetric key (password) that was held in common. Difficulties arose, however, in the management of cryptographic groups such as this. Because all group members shared the same secret, adding or removing members from the group often involved distributing new keys to all existing members. The extensive "re-keying" in a group environment required by prior art often created confusion and administrative inefficiency, since key management is considered perhaps the most problematic aspect of cryptography and one of the greatest barriers to its widespread adoption. Thus, there remains a need for methods and systems providing for secure communication in a group environment that permit members to leave the group while permitting remaining group members to securely use existing keys for group communication thereafter without permitting former members to decrypt the communication intended for decryption only be remaining group members.

SUMMARY OF THE INVENTION

The present invention is directed to and provides systems and methods for secure communication in a group environment. The systems and methods provided according to the present invention provide for the addition and removal of group members without the need to issue new keys to existing group members, and also provide for several other innovations that make secure communication to a group more robust and efficient.

Accordingly, one aspect of the present invention is to provide secure systems and methods for cryptographic communications to a group, where each member of the group has at least one distinct key that is capable of decrypting messages that are encrypted to the group.

Another aspect of the present invention is to provide secure systems and methods for cryptographic communications to a group, wherein X members of a group are together able to decrypt messages that are encrypted using a public key for the group but less than X members of the group are unable to decrypt such messages.

Another another aspect of the present invention is to provide systems and methods whereby a member of a group can digitally sign a message on behalf of that group and the recipient of a digitally signed message can determine that the message was sent by a member or members of a particular cryptographic group.

Another aspect of the present invention is to provide systems and methods where members can be removed from a cryptographic group and be prevented from decrypting new messages to the group while the remaining members can still user their existing private keys to decrypt, or in some cases to merely contribute to the decryption of, new messages to the group.

Still another aspect of the present invention is to provide systems and methods where new members can be added to a cryptographic group while the remaining members can still user their existing private keys to decrypt, or in some cases to merely contribute to the decryption of, new messages to the group.

Still another aspect of the present invention is to provide systems and methods for transforming messages that were previously encrypted to a cryptographic group in such a way that former group members are prevented from decrypting, or contributing to the decryption of, these messages but the remaining members can still user their existing private keys to decrypt, or in some cases to merely contribute to the decryption of, new messages to the group.

These and other aspects of the present invention will become apparent to those skilled in the art after a reading of the following description of the preferred embodiment when considered with the claims.

DETAILED DESCRIPTION OF EMBODIMENTS
OF THE PRESENT INVENTION

For the present invention, the term messages is defined and used herein to include information, documents, files, and/or data that are preferably, but not necessarily, in electronic form. The term group is defined as organizational unit consisting of at least two members. A member can be an individual unit such as a one person, computer, or computer network, or it can be a group of individual units or groups.

The present invention provides a system and methods for secure communication of messages to a group where each member of the group has at least one distinct key that is operable for decryption of encrypted messages sent to the group. The present invention provides a system for establishing cryptographic communications including:

a group G of user members distributed over a network of devices configured and connected for electronic communication with each other;

at least one private key associated with each member of group G, wherein the key(s) are operable for decryption of encrypted messages sent over the network, thereby providing a secure system for establishing cryptographic communications to the group G.

Preferably, the system and methods provides that each member of group G is able to use a distinct private key to decrypt messages that are encrypted using a public key for the group, $P_G$; in such a system the distinct private key associated with each member of the group G is operable to decrypt messages that are encrypted using a public key for the group $P_G$, preferably wherein one or more members of a group G can be removed from the group and the remaining members of the group can still use their respective private keys to decrypt messages encrypted to the group G.

Also, preferably, the system and methods provides that X members of group G are together able to decrypt messages that are encrypted using a public key for the group, $P_G$, but less than X members of group G are unable to decrypt such messages preferably wherein one or more members of a group G can be removed from the group and the remaining members of the group can still use their respective private keys to help to decrypt (i.e., by together using their keys to decrypt) messages encrypted to the group G.

Figure 1:
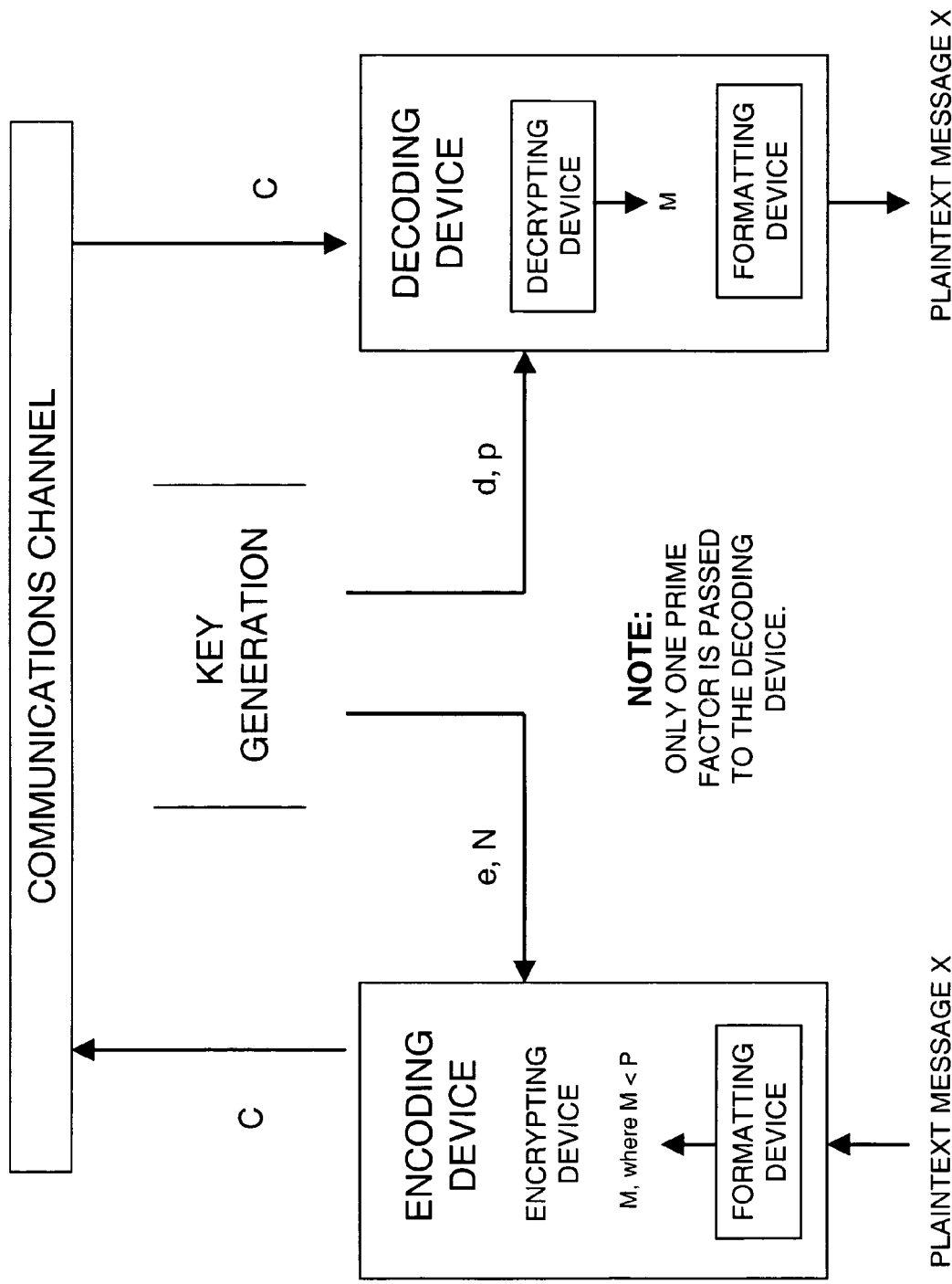
FIG. 1 illustrates a flow diagram showing a method for key generation according to the present invention.
Figure 2:
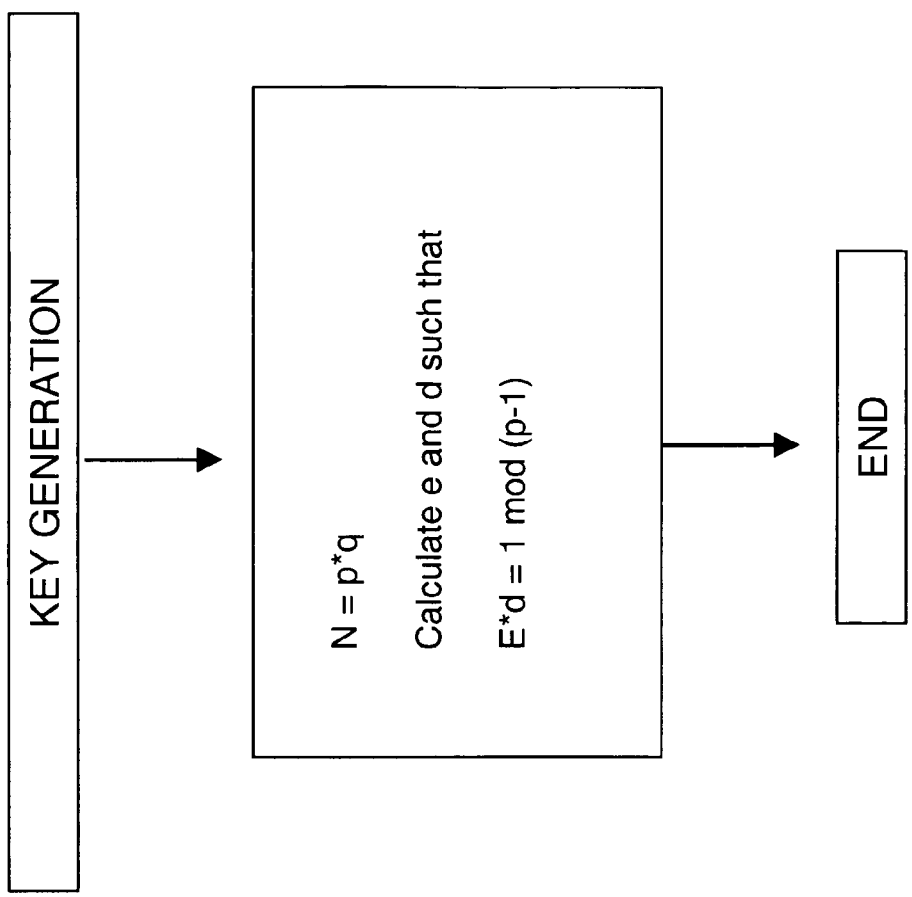
FIG. 2 illustrates a flow diagram showing steps included in a method for key generation according to the present invention.
Figure 3:
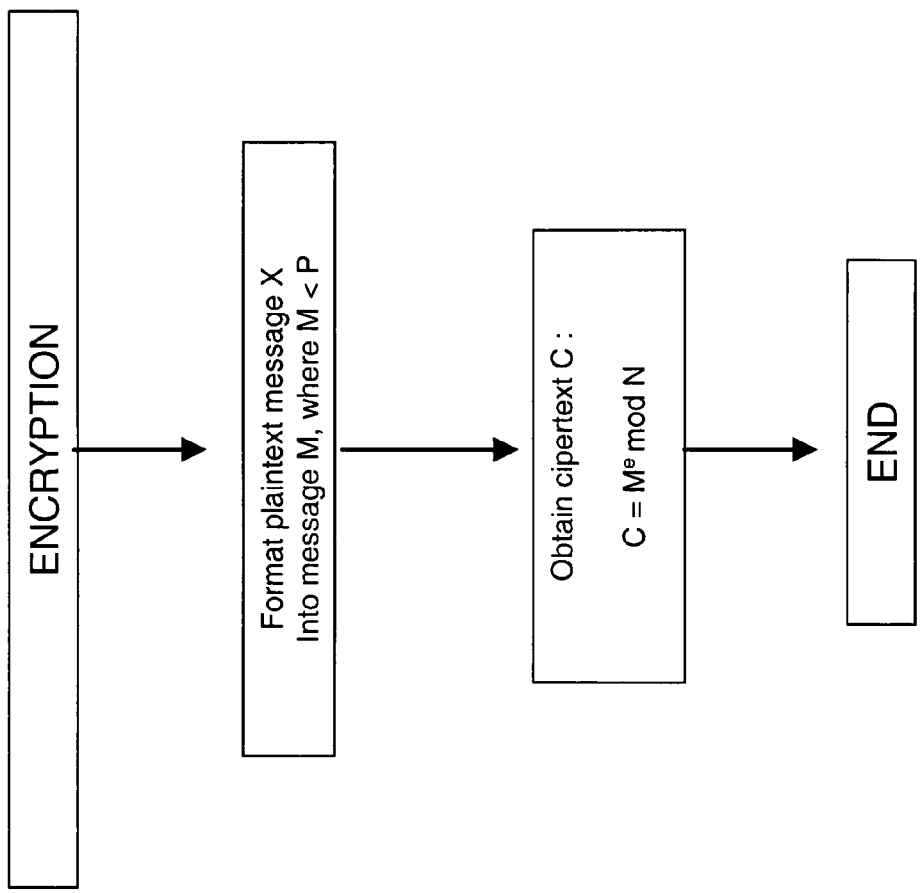
FIG. 3 illustrates a flow diagram showing steps included in a method for encryption according to the present invention.
Figure 4:
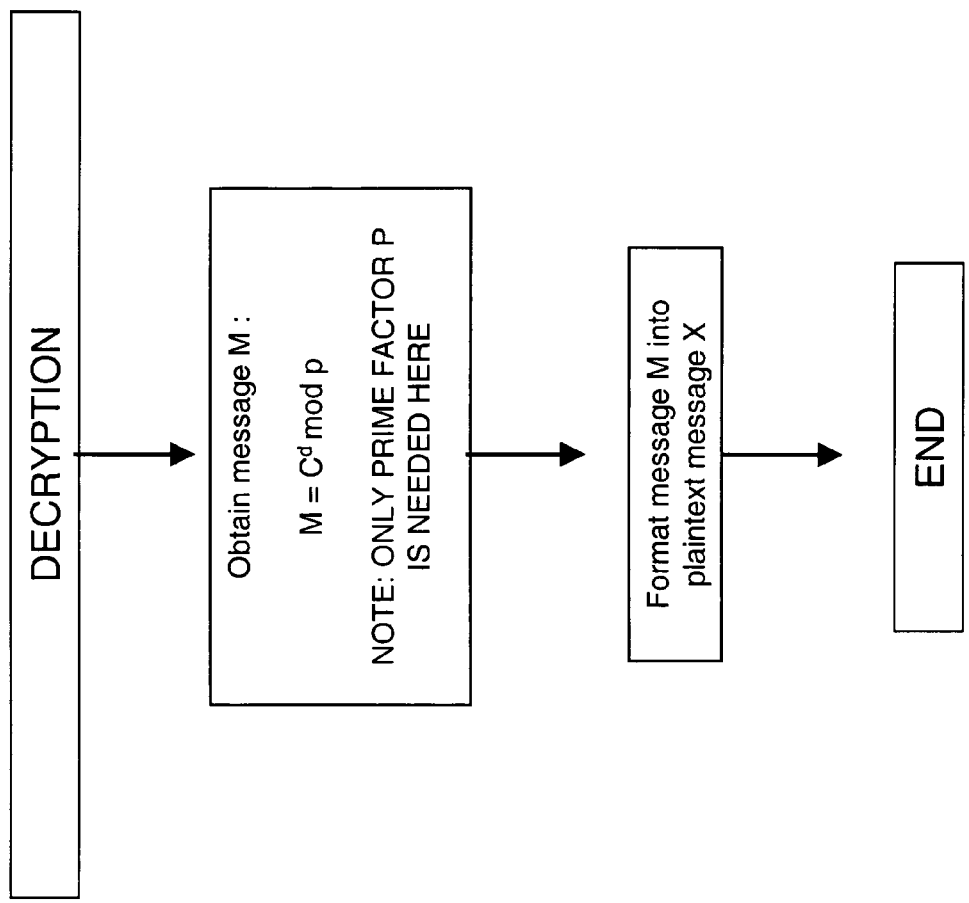
FIG. 4 illustrates a flow diagram showing steps included in a method for decryption according to the present invention.

The following figures are provided to illustrate aspects and/or embodiments of the present invention as described in the specification and are not intended to limit the invention thereto. FIG. 1 illustrates a flow diagram showing a method for key generation according to the present invention, including the encoding and decoding of message X. FIG. 2 illustrates a flow diagram showing steps included in a method for key generation according to the present invention. FIG. 3 illustrates a flow diagram showing steps included in a method for encryption according to the present invention. FIG. 4 illustrates a flow diagram showing steps included in a method for decryption according to the present invention.

In systems and methods of the present invention, group G includes K members, $G_1, G_2, \ldots G_K$; wherein each member of group G, $G_M$, is associated with a public key $P_{GM}$; wherein each public key $P_{GM}$ includes a public modulus $N_{GM}$, a plaintext minimum $MIN_G$, and a plaintext maximum $MAX_{GM}$; wherein the group public key $P_G$ includes public exponent $e_G$, public modulus $N_G$, and plaintext maximum $MAX_G$; wherein $N_G$ is generated as the product of the public moduli $N_{G1}$, $N_{G2}, \ldots N_{GK}$ and an arbitrary integer $I_G$, where $I_G > 0$; wherein $MIN_G$ preferably equals zero; alternatively $MIN_G$ equals an arbitrary number; wherein $MAX_G$ is preferably generated as a integer less than or equal to the minimum of the plaintext maximums $MAX_{G1}, MAX_{G2}, \ldots MAX_{GK}$ but alternatively $MAX_G$ is set to an arbitrary number;

$$N_G = N_{G1} * N_{G2} * \ldots N_{GK} * I_G$$

$$MAX_G < MIN(MAX_{G1}, MAX_{G2}, \ldots MAX_{GK})$$

Wherein $e_G$ is preferably generated as a prime number. In such systems and methods according to the present invention, it is preferable that at least a partial factorization of the public modulus $N_G$ into a group of integers is provided in the group public key $P_G$.

In systems and methods of the present invention, a plaintext message M is encrypted into the ciphertext message C using any method the produces a value equivalent to:

$$C = M^{e_G} \bmod N_G, M_{MIN} < M < M_{MAX}$$

wherein, if a partial factorization of the public modulus $N_G$ is provided in the group public key $P_G$ and the K provided factors of the public modulus $N_G$ are $N_{GM1}, N_{GM2}, \ldots N_{GMK}$, encryption preferably occurs as:

$$C_1 = M^{e_G} \bmod N_{GM1}, M_{MIN} < M < M_{MAX}$$

$$C_2 = M^{e_G} \bmod N_{GM2}, M_{MIN} < M < M_{MAX}$$

$$\vdots$$

$$C_K = M^{e_G} \bmod N_{GMK}, M_{MIN} < M < M_{MAX}$$

where $C_1, C_2, \ldots C_K$ are combined to generate C.

Furthermore, the systems and methods provide that $C_1$, $C_2, \ldots C_K$ are operable to be functional in combination to generate C using the Chinese Remainder Theorem or a variant of the Chinese Remainder Theorem.

Preferably, in the systems and methods according to the present invention, $M_{MIN}$ equals $MIN_G$ and $M_{MAX}$ equals $MAX_G$; alternatively, $M_{MIN}$ is generated as a number that is greater than the sum of the largest X–1 values of the public keys, $P_{GM}$, of the members of group G and $M_{MAX}$ is generated as a number that is less than the sum of the smallest X values of the public keys, $P_{GM}$, of the members of group G; alternatively, $M_{MIN}$ is generated as a number that is greater than the sum of the largest X–1 values of the plaintext maximums, $MAX_{GM}$, of the members of group G and $M_{MAX}$ is generated as a number that is less than the sum of the smallest X values of the plaintext maximums, $MAX_{GM}$, of the members of group G; alternatively, $M_{MIN}$ is generated as a number that is larger than a certain arbitrary numerical representation of a combination of group members and $M_{MAX}$ is generated as a number that is smaller than a certain arbitrary numerical representation of a combination of group members.

Preferably, the public key $P_{GM}$ and private key $PRIV_{GM}$ for group member $G_M$ have been generated using standard RSA methods where the public exponent for $G_M$ is equal to the public exponent of group G, $e_G$, and the plaintext maximum $MAX_{GM}$ is set to an integer less than the public modulus $N_{GM}$.

Alternatively, the public modulus $N_{GM}$ for $G_M$ is generated as a large prime number, the public exponent $e_{GM}$ is set to be equal to the public exponent of group G, $e_G$, and the plaintext maximum $MAX_{GM}$ is set to an integer less than the public modulus $N_{GM}$, or the public key $P_{GM}$ and private key $PRIV_{GM}$ for group member GM have been generated such that the public modulus $N_{GM}$ is equal to a large prime number and the public exponent $e_{GM}$ is equal to the public exponent of group G, $e_G$, and the plaintext maximum $MAX_{GM}$ is set to an integer less than the public modulus $N_{GM}$ and the private exponent $d_{GM}$ has been generated using any method that produces a value that satisfies the relationship: $e_{GM}*d_{GM}=1 \bmod (N_{GM}-1)$.

The systems and methods of the present invention provide that the ciphertext C can preferably be decrypted by any member of group G, $G_M$, by first generating $C_M$ using any method that produces a value equivalent to $C_M=C \bmod G_M$ and then performing decryption on ciphertext $C_M$ using the private key of group member $G_M$ with standard RSA methods.

The present invention systems and methods are operable to permit single members, or any single member of group G, $G_M$, to decrypt the ciphertext C using the private key(s) of group member $G_M$ with standard RSA methods.

Also or alternatively, the present invention systems and methods are operable to permit or require group member collaboration for decryption, wherein the ciphertext C can be decrypted by X members of group G, $N_{GM1}, N_{GM2} \ldots N_{GMX}$, collaborating together as:

$$M_1 = C_{M1}^{e_G} \bmod N_{GM1}, C_{M1} = C \bmod N_{GM1}$$

$$M_2 = C_{M2}^{e_G} \bmod N_{GM2}, C_{M2} = C \bmod N_{GM2}$$

$$\vdots$$

$$M_X = C_{MX}^{e_G} \bmod N_{GMX}, C_{MX} = C \bmod N_{GMX}$$

Where $M_1, M_2, \ldots M_x$ are combined to generate M and/or wherein $M_1, M_2, \ldots M_x$ are combined to generate M using the Chinese Remainder Theorem or a variant of the Chinese Remainder Theorem.

In the present invention, any member of group G can digitally sign a message M on behalf of group G using standard RSA methods. Preferably, a digitally signed message provided according to the cryptographic methods and systems of the present invention is capable of being verified as a digital signature of group G by using standard RSA methods and additionally including the following step to verify it as a valid group digital signature:

Ensure that the following relationship holds between the public modulus of the digitally signed message $N_{GM}$, the public exponent of the digitally signed message $e_{GM}$, the public modulus of the group $N_G$, and the public exponent of the group $e_G$:

$$e_{GM}=e_G$$

$$0=N_G \bmod N_{GM}$$

In systems and methods of the present invention, one or more new members $G_{N1}, \ldots, G_{NK}$ can be added to the initial group G using the following steps:

$N_G$ is re-generated as the product of itself and $N_{GNP}$, where $N_{GNP}$ is the product of the public moduli of the public keys for $G_{N1}, \ldots, G_{NK}$, where $MAX_G$ is re-generated as the lower of the two values $MAX_G$ and $MAX_{GNP}$, where $MAX_{GNP}$ is generated as the lowest of the plaintext maximum values $MAX_{GN1}, \ldots MAX_{GNK}$:

$$N_{GNP}=N_{GN1}* \ldots N_{GNK}$$

$$N_G=N_G*N_{GNP}$$

$$MAX_{GNP}=MIN\{MAX_{GN1}, \ldots, MAX_{GNK}\}$$

$$MAX_G=MIN\{MAX_G, MAX_{GNP}\}$$

Advantageously, the systems and methods of the present invention provide for removing one or more existing group $G_{R1}, \ldots, G_{RK}$ from the initial group G using the following steps: $N_G$ is re-generated using any method that produces a value equivalent to the quotient of a division operation where $N_G$ is the dividend and $N_{GRP}$ is the divisor:

$$N_{GRP}=N_{GR1}* \ldots N_{GRK}$$

$$N_{GT}=N_G/N_{GRP}$$

$$N_G=N_{GT}$$

and the plaintext maximum $MAX_G$ is re-generated as the minimum value of the set of the plaintext maximums for the remaining members of group G.

$$MAX_G=MIN\{MAX_{G1}, MAX_{G2} \ldots, MAX_{GK}\}$$

where K is the number of members in group G

In preferred embodiments of the present invention, systems and methods provide that the removed members $G_{R1}, \ldots, G_{RK}$ can be prevented from decrypting a ciphertext message C and current members of group G can continue to decrypt ciphertext message C with their existing private keys, where C was encrypted using the group public key before $G_{R1}, \ldots, G_{RK}$ were removed from the group, including the steps of:

Transforming the ciphertext message C using any method that produces a value equivalent to the remainder of a division operation where $N_{GT}$ is the dividend and C is the divisor:

$$C = C \bmod N_{GT}$$

In one embodiment of the present invention, a method is provided for secure communication of messages to a group where each member of the group has at least one distinct key that is alone capable of decrypting messages sent to the group.

In another embodiment of the present invention, a method is provided for secure communication of messages to a group where each member of the group has at least one distinct key that can help decrypt messages sent to the group but at least one other member of the group may be required to fully decrypt messages sent to the group.

In order for secure communication to a group to be possible, a group must first be formally established. In the present invention, any group G must include a public key $P_G$. $P_G$ is a set which includes a public modulus $N_G$, a public exponent $e_G$, a plaintext minimum $MIN_G$, and a plaintext maximum $MAX_G$. It is assumed that each member of group G has its own public modulus $N_{GM}$, a public exponent that is equal to the group public exponent, and one or more private keys that are operable for decryption of messages that are encrypted with the public exponent $e_G$ and the public modulus $N_{GM}$. The public modulus $N_G$ is generated as the product of public moduli of the members of group G, multiplied by an integer $I_G$, where $I_G > 0$. Preferably, $I_G = 1$ so that $N_G$ is simply the product of the moduli of the members of group G. The plaintext minimum represents the minimum message size that may be encrypted to the group. Most often, this number is set to zero, but it may also be set in such a way that two or more group members must collaborate to successfully decrypt a message that is encrypted to group G. Preferably, plaintext maximum $MAX_G$ is set to an integer that is less than the smallest public modulus of the members of group G. In some embodiments of the invention, the plaintext maximum may also be set such that any two or more members are operable together to decrypt messages encrypted to group G, or the plaintext maximum may be set at an arbitrary value to accomplish a cryptographic goal, such as requiring or ensuring that a particular combination of group members is able to decrypt messages that have been encrypted to the group. The group public key can optionally include, or merely contain references to, at least a partial factorization of the public modulus $N_G$ and other relevant information such as padding or hashing conventions. The partial factorization of $N_G$ is preferably used in methods and systems of the present invention to improve the efficiency of encryption operations, which may be especially important for large groups.

In one embodiment of the present invention, a plaintext message M is capable of being securely transmitted to a member of group G by encrypting M into ciphertext C using any method the produces a value equivalent to:

$$C = M^{e_G} \bmod N_G, M_{MIN} < M < M_{MAX}$$

In this embodiment, M must be in the form of an integer and must fall in a range such that $M_{MIN} < M < M_{MAX}$. Preferably, $M_{MIN} = MIN_G$ and $M_{MAX} = MAX_G$. In some embodiments of the present invention, however, $M_{MIN}$ and $M_{MAX}$ are capable of being set by the message sender in order to override the default $MIN_G$ and $MAX_G$ values for the group. For example, in one embodiment of the present invention, the $MIN_G$ and $MAX_G$ are capable of being set such that any single member of the group is capable of decrypting messages sent to group G, but the sender may require that two or more members of the group collaborate to decrypt the message. In this case, $M_{MIN}$ and $M_{MAX}$ may be set in order to accomplish this goal. In cases where $M_{MIN}$ and $M_{MAX}$ override the default $MIN_G$ and $MAX_G$ values for the group, it is preferable that the values of $M_{MIN}$ and $M_{MAX}$ are conveyed to the group so that successful decryption is possible.

In another embodiment of the present invention, where the public key for group G contains a partial factorization of the group public modulus $N_G$ and the K provided factors of the public modulus $N_G$ are $N_{GM1}, N_{GM2}, \ldots N_{GMK}$, a plaintext message M may be securely transmitted group G by encrypting M into ciphertext C as:

$$C_1 = M^{e_G} \bmod N_{GM1}, M_{MIN} < M < M_{MAX}$$

$$C_2 = M^{e_G} \bmod N_{GM2}, M_{MIN} < M < M_{MAX}$$

$$C_K = M^{e_G} \bmod N_{GMK}, M_{MIN} < M < M_{MAX}$$

where $C_1, C_2, \ldots C_K$ are combined to generate C using the Chinese Remainder Theorem or one of its variants, such as set forth in the references C. Vuillame *Efficiency Comparison of Several RSA Variants*, which are incorporated herein by reference in their entirety.

In one embodiment of the present invention, ciphertext C is decrypted to plaintext M by a member of group G, $G_M$, using any method that produces a value equivalent to $M = C^{d_{GM}} \bmod N_{GM}$. In a more preferable embodiment, ciphertext C is decrypted by group member $G_M$ by first generating CM using any method that produces a value equivalent to $C_M = C \bmod N_{GM}$ and then generating plaintext message M using any method that produces a value equivalent to $M = C_M^{d_{GM}} \bmod N_{GM}$.

In another embodiment of the present invention, ciphertext C requires X members of group G, $G_1, G_2, \ldots G_x$ collaborate to decrypt C into plaintext message M by first generating $M_1, M_2, M_x$ using any method that produces a value equivalent to:

$$M_1 = C_{M1}^{e_G} \bmod N_{GM1}, C_{M1} = C \bmod N_{GM1}$$

$$M_2 = C_{M2}^{e_G} \bmod N_{GM2}, C_{M2} = C \bmod N_{GM2}$$

$$\vdots$$

$$M_X = C_{MX}^{e_G} \bmod N_{GMX}, C_{MX} = C \bmod N_{GMX}$$

where $M_1, M_2, \ldots M_x$ are combined to generate M using the Chinese Remainder Theorem or one of its variants.

In one embodiment of the present invention, a method for group digital signatures is provided. According to the present invention, a digital signature D for message M on behalf of group G can be generated by a member of group G using the public modulus for that member, $N_{GM}$, and the private exponent for that member, $d_{GM}$, with standard RSA-compatible digital signature methods such as set forth in the references B. Kalinski *RSA Digital Signature Scheme*, which are incorporated herein by reference in their entirety. The digital signature D functions to verify that message M was sent by a member of group G by using standard RSA-compatible methods for signature verification and additionally including the following step to verify that digital signature D is valid for group G:

Ensure that the following relationship holds between the public modulus of the digitally signed message, $N_{GM}$, the public exponent of the digitally signed message $e_{GM}$, the public modulus of the group $N_G$, and the public exponent of the group $e_G$:

$$e_{GM}=e_G$$

$$0=N_G \bmod N_{GM}$$

In one embodiment of the present invention, one or more new members $G_{N1}, \ldots, G_{NK}$ can be added to group G after the initial formation of the group G with its initial members. Although the addition of new members to the group does not require any of the group members to change their individual public or private keys, the present invention provides that some changes must occur to the public key for group G so that the private keys of the new members to the group are operable for decryption by the new members. First, the public modulus for group G, $N_G$, is re-generated as the product of itself and $N_{GNP}$, where $N_{GNP}$ is the product of the public moduli for the new group members $G_{N1}, \ldots, G_{NK}$. Additionally, according to the present invention, the plaintext maximum $MAX_G$ must be reset if the public modulus of any new group member is less than the current plaintext maximum $MAX_G$. In equation form, the new values for $N_G$ and $MAX_G$ are generated as follows:

$$N_{GNP}=N_{GN1}* \ldots N_{GNK}$$

$$N_G=N_G*N_{GNP}$$

$$MAX_{GNP}=MIN\{MAX_{GN1}, \ldots, MAX_{GNX}\}$$

$$MAX_G=MIN\{MAX_G, MAX_{GNP}\}$$

Optionally, after the addition of new members to group G, both $MAX_G$ and $MIN_G$ can be re-generated according to the cryptographic goals of the group.

In one embodiment of the present invention, one or more existing group $G_{R1}, \ldots, G_{RK}$ can be removed from group G, i.e., the initial group G later comprises fewer members than the entire set of initial members. Although the removal of members from the group does not require any of the group members to change their individual public or private keys, some changes must occur to the public key for group G so that the private keys of the removed members are no longer operable for decryption, as provided by the methods and systems of the present invention. First, the public modulus for group G, $N_G$, is transformed using any method such that none of the public moduli, $N_{GR}$, of any of the removed group members divides evenly into the new group public modulus. One method of transforming the public modulus for group G is to first generate the product of the public moduli of all removed group members, $N_{GRP}$. After this value is generated, $N_G$ is operable to be transformed by dividing its original value by $N_{GRP}$. In equation form, the new value for $N_G$ is generated according to methods of the present invention as follows:

$$N_{GRP}=N_{GR1}* \ldots N_{GRK}$$

$$N_{GT}=N_G/N_{GRP}$$

Optionally, the value for the plaintext maximum $MAX_G$ is also capable of being re-generated after the removal of one or more group members. Failure to re-generate this value will not prevent any group members from decrypting messages that are encrypted to the group, but it is preferable because it keeps all cryptographic values related to group G as accurate as possible. $MAX_G$ can simply be re-generated as an integer that is less than the minimum of the public moduli of the remaining members of group G. In equation form:

$$MAX_G<MIN\{MAX_{G1}, MAX_{G2} \ldots, MAX_{GK}\}$$

where K is the number of members in group G. Also optionally, after the removal of these members from group G, both $MAX_G$ and $MIN_G$ can be re-generated according to the cryptographic goals of the group.

One embodiment of the present invention includes a method for the transformation of ciphertext, $C_P$, which was previously encrypted to group G, in such a way that members who have been removed from group G since the encryption of message $M_P$ into ciphertext $C_P$ would be prevented from future decryption of message $M_P$ using $C_P$. But, $C_P$ must be transformed in such a way that existing members of group G are still capable of decrypting $C_P$ to the plaintext message $M_P$. Assuming that the public modulus for group G after the removal of members $G_{R1}, \ldots G_{RK}$ is represented as $N_{GT}$, the ciphertext $C_P$ can be transformed using any method that produces a value equivalent to the remainder of a division operation where $N_{GT}$ is the dividend and $C_P$ is the divisor. In equation form:

$$C=C_P \bmod N_{GT}$$

DESIGN EXAMPLES

This section outlines a few design examples, not necessarily optimized, but illustrative of what can be done for systems and methods for group cryptography, wherein the group keys permit decryption by group members and permit secure communications even after adding and/or removing members from the initial group.

Example #1

This example outlines the creation of a cryptographic group. In this scenario, cryptographic group G contains four members, $G_1$, $G_2$, $G_3$, and $G_4$. Group G has already selected a public exponent, $e_G$, of 65537 ($2^{16}+1$) which is a common value for RSA-compatible public/private key pairs. Each group member already retains an RSA-compatible public/private key pair with a public exponent of 65537. In this example, the public key for group G consists of the set of numbers $\{N_G, e_G, MIN_G, MAX_G\}$, where $N_G$ is calculated as the product of the public moduli of all of the group members: $N_G=N_{G1}*N_{G2}*N_{G3}*N_{G4}*I_G$, $I_G$ is equal to 1, $MIN_G$ is equal to zero, and $MAX_G$ is equal to a number less than or equal to the minimum of the public moduli of all of the group members: $MIN\{N_{G1}, N_{G2}, N_{G3}, N_{G4}\}=N_{G1}$.

Example #2

This example demonstrates the encryption of a plaintext message $M_T$ to group G and then the decryption of that same message by a single member of group G. A typical preliminary step is to convert the text representation of the plaintext message into an integer representation so the mathematical encryption operation can be performed on it. A simple example of a text to integer conversion function would be to represent A=1, B=2, C=3 etc., but in reality a more complex and efficient conversion function is typically used. Using the conversion function, $M_T$ is converted into plaintext integer M. Before encryption occurs, it is essential to ensure that $MIN_G<M<MAX_G$. Typically, this restriction is not an issue because in practice M is usually a symmetric key that is used to encrypt longer text messages. M is then encrypted to ciphertext C using the following equation: $C=M^{eG} \bmod N_G$.

Any member of group G is able to decrypt ciphertext C. However, for the purpose of example, we will assume that group member $G_1$ is the member who wishes to decrypt C. First, $G_1$ calculates $C_1$ as: $C_1=C \bmod N_{G1}$. Then, decryption can occur using any RSA-compatible decryption scheme with $C_1$. For the sake of simplicity, though, decryption is demonstrated here using the standard RSA method: $M=C_1^{dG1} \bmod N_{G1}$. M can then be converted to $M_T$ by reversing the publicly available conversion function that was used prior to encryption.

Example #3

This example illustrates an encryption operation where at least two members of group G are required to collaborate to decrypt a message encrypted to the group. In this implementation, group G sets $MIN_G$ as the largest of the public moduli of the members of the group. We will assume that $N_{G1}<N_{G2}<N_{G3}<N_{G4}$, so $MIN_G=N_{G4}$. Group G sets $MAX_G$ to be the sum of the two smallest public moduli of the members of the group, so $MAX_G=N_{G1}+N_{G2}$. This process of setting $MIN_G$ and $MAX_G$ ensures that no single group member can decrypt a message but any two members are sufficient to decrypt a message.

Next, plaintext message $M_T$ is encrypted to group G. A typical preliminary step is to convert the text representation of the plaintext message into an integer representation so the mathematical encryption operation can be performed on it. A simple example of a text to integer conversion function would be to represent A=1, B=2, C=3 etc., but in reality a more complex and efficient conversion function is typically used. Using the conversion function, $M_T$ is converted into plaintext integer M. Before encryption occurs, it is essential to ensure that $MIN_G<M<MAX_G$. If $M<MIN_G$, a padding mechanism can be used to increase the size of M. The padding mechanism should be disclosed publicly such that, upon decryption, the padded portion of the message can be recognized and discarded so that only the original value for M remains. M is then encrypted to ciphertext C using the following equation: $C=M^{eG} \bmod N_G$.

Because of the value of the original message M, no single member of the group will be able to decrypt the message but any two or more members can collaborate to decrypt the message. In this example, let's assume that group members $G_1$ and $G_2$ wish to decrypt ciphertext C. Prior to decryption, a couple of values need can be pre-computed. One such value is $N_{G1,2}$: $N_{G1,2}=N_{G1}*N_{G2}$. The other pre-computed value is $N_{G1}\_inv\_N_{G2}$: $N_{G1}\_inv\_N_{G2}=N_{G1}^{-1} \bmod N_{G2}$.

To decrypt ciphertext C to plaintext M, $G_1$ and $G_2$ each decrypt C using the methods described in example #2 to produce $M_{G1}$ and $M_{G2}$, respectively. Then, the following steps are performed to combine $M_{G1}$ and $M_{G2}$ to produce M:

$V=M_{G2}-M_{G1} \bmod N_{G2}$;

$V_1=V*(N_{G1}\_inv\_N_{G2}) \bmod N_{G2}$;

$M_{TEMP}=V_1*N_{G1} \bmod N_{G1,2}$;

$M=M_{TEMP}+M_{G1} \bmod N_{G1,2}$;

M is the plaintext decryption of ciphertext C.

Example #4

This example illustrates the removal of a group member $G_1$ from group G. The removal of $G_1$ requires that certain portions of the group public key be re-generated. It is not necessary, however, to distribute any new keys to members of group G. In fact, members of group G do not need to be aware of the removal of another member. As outlined in the first example, the public key for group G consists of the set of numbers {$N_G$, $e_G$, $MIN_G$, $MAX_G$}. To remove member $G_1$ from group G, it is required that the group public modulus $N_G$ be modified such that $N_{G1}$ (the public modulus for former group member $G_1$) no longer divides evenly into $N_G$. An easy method of accomplishing this is to reset $N_G$ as $N_G/N_{G1}$. For the purpose of clear notation, we will refer to the group public modulus after the removal of $G_1$ as $N_{GT}$: $N_{GT}=N_G/N_{G1}$. Optionally, $MIN_G$ and $MAX_G$ can be re-calculated. Building on example #1, $MIN_G$ will continue to equal zero. Assuming that $N_{G1}<N_{G2}<N_{G3}<N_{G4}$, however, $MAX_G=N_{G2}$ once $G_1$ is removed from the group.

Example #5

This example illustrates the transformation of previously encrypted files such that removed members are no longer able to decrypt them. From a theoretical standpoint, any file previously encrypted file that a former group member was once able to decrypt could have already been decrypted and stored in plaintext by that member, so there is no point to transforming previously encrypted files. From a practical standpoint, though, a company or organization may still wish to transform previously encrypted files to prevent their decryption by former members since former members often have not decrypted all of the organization's files and stored them locally.

Building on examples #2 and #4, assume that message $M_T$ was encrypted to group G before group member $G_1$ was removed. Further, assume that the encrypted ciphertext C remains on the server of group G for decryption by group members. One way to transform ciphertext C would be for a member of group G to decrypt C into plaintext $M_T$ and then re-encrypt $M_T$ into $C_T$ using the new group public modulus $N_{GT}$. There are two main difficulties with this approach, though. First, there may be thousands or millions of other files that were encrypted to group G while $G_1$ was a member of the group, and decrypting and then encrypting each message is a computationally intensive process. Second, only a member of group G could perform such an operation, since the message must first be decrypted before re-encrypting it. In the case of messages that require more then one group member to decrypt them, even individual group members may not have enough access to the files to transform all of them.

The present invention proposes an efficient technique which prevents removed member $G_1$ from decrypting $C_T$ but allows all other members to decrypt $C_T$ with the same key that they used to decrypt C. In addition, the operation can be performed by any third party who happens to be storing the ciphertext C. Ciphertext C is transformed into $C_T$ as follows: $C_T=C \bmod N_{GT}$.

Example #6

This example illustrates a mechanism whereby a member of group G can digitally sign a message M on behalf of the group and the recipient of the digitally signed message M can verify that the message was sent by a member of the group.

The digital signature D of message M by group member, $G_2$, occurs using standard RSA-compatible methods. Usually, these methods involve creating a hash, H, of message M using a one-way, collision-resistant method such as MD5 or SHA1. H is then transformed into digital signature D as follows: $D=H^{dG2} \bmod N_{G2}$.

To verify that message M was indeed sent by a member of group G, the recipient first needs to determine the validity of digital signature D with respect to $G_2$. First, the recipient uses the public key information for $G_2$ to resolve digital signature D to $H_v$: $H_v = D^{e_G} \mod N_{G2}$. Notice that the public exponent for group G, $e_G$, was used instead of the value provided by $G_2$. The public exponents should be the same for both, but using the public exponent for the group helps verify that D was created by a member of group G. Next, the recipient creates a hash $H_M$ of message M (this operation must be the same type of hash that was used to generate the hash H during the digital signature process) and ensures that $H_V = H_M$. Finally, to verify that the signer of message M is a member of group G, the recipient confirms that the public modulus of the signer of message M, $N_{G2}$, divides evenly into the public modulus of group G, $N_G$: $0 = N_G \mod N_{G2}$.

Certain modifications and improvements will occur to those skilled in the art upon a reading of the foregoing description. All modifications and improvements have been deleted herein for the sake of conciseness and readability but are properly within the scope of the following claims.

What is claimed is:

1. A method for establishing cryptographic communications comprising the steps of:
   providing a group G of user members distributed over a network of devices configured and connected for electronic communication with each other;
   providing and associating at least one private key with each member of group G, wherein the key(s) are operable for decryption of encrypted messages sent over the network;
   transmitting an encrypted message to at least one member; and
   at least one member of group G using its private key to decrypt the encrypted message,
thereby providing a secure system for cryptographic communications across the group G, wherein group G consists of K members, $G_1, G_2, \ldots G_K$; further including the step of associating each member of group G, $G_M$, with a public key $P_{GM}$; wherein each public key $P_{GM}$ includes a public modulus $N_{GM}$ and a plaintext maximum $MAX_{GM}$; wherein the group public key $P_G$ includes public exponent $e_G$, public modulus $N_G$, plaintext minimum $MIN_G$, and plaintext maximum $MAX_G$; wherein $N_G$ is generated as the product of the public moduli $N_{G1}, N_{G2}, \ldots N_{GK}$; wherein $MIN_G$ equals zero; wherein $MAX_G$ is generated as the minimum of the plaintext maximums $MAX_{G1}, MAX_{G2}, \ldots MAX_{Gk}$;

$$N_G = N_{G1} * N_{G2} * \ldots N_{GK}$$

$$MAX_G = MIN(MAX_{G1}, MAX_{G2}, \ldots MAX_{GK})$$

wherein $e_G$ is preferably generated as a prime number.

2. The method of claim 1, further including the steps of generating $MIN_G$ and $MAX_G$ are in an arbitrary way such that certain members or combinations of members of group G are required to collaborate to decrypt messages that are encrypted to group G.

3. The method of claim 1, further including the step of providing at least a partial factorization of the public modulus $N_G$ into a group of integers in the group public key $P_G$.

4. The method of claim 1, further including the step of encrypting a plaintext message M into the ciphertext message C using any method the produces a value equivalent to:

$$C = M^{e_G} \mod N_G, MM1N < M < MMAX.$$

5. The method of claim 4, wherein the K provided factors of the public modulus $N_G$ are $N_{GM1}, N_{GM2}, \ldots N_{GMK}$; and wherein the step of encrypting is operable according to:

$$C_1 = M^{e_G} \mod N_{GM1}, M_{MIN} < M < M_{MAX}$$

$$C_2 = M^{e_G} \mod N_{GM2}, M_{MIN} < M < M_{MAX}$$

$$\vdots$$

$$C_K = M^{e_G} \mod N_{GMK}, M_{MIN} < M < M_{MAX}$$

Where $C_1, C_2, \ldots C_K$ are combined to generate C.

6. The method of claim 5, further including the step of combining $C_1, C_2, \ldots C_K$ to generate C using the Chinese Remainder Theorem or a variant of the Chinese Remainder Theorem.

7. The method of claim 4, where $M_{MIN}$ equals zero and $M_{MAX}$ equals $MAX_G$.

8. The method of claim 4, further including the step of generating $M_{MIN}$ as a number that is greater than the sum of the largest X−1 values of the public keys, $P_{GM}$, of the members of group G and $M_{MAX}$ is generated as a number that is less than the sum of the smallest X values of the public keys, $P_{GM}$, of the members of group G.

9. The method of claim 4, further including the step of generating $M_{MIN}$ as a number that is greater than the sum of the largest X−1 values of the plaintext maximums, $MAX_{GM}$, of the members of group G and $M_{MAX}$ is generated as a number that is less than the sum of the smallest X values of the plaintext maximums, $MAX_{GM}$, of the members of group G.

10. The method of claim 4, further including the step of generating $M_{MIN}$ as a number that is larger than a certain arbitrary numerical representation of a combination of group members and $M_{MAX}$ is generated as a number that is smaller than a certain arbitrary numerical representation of a combination of group members.

11. The method of claim 1, further including the step of generating the public key $P_{GM}$ and private key $PRIV_{GM}$ for group member $G_M$ using standard RSA methods where the public exponent for $G_M$ is equal to the public exponent of group G, $e_G$, and the plaintext maximum $MAX_{GM}$ is set to an integer less than the public modulus $N_{GM}$.

12. The method of claim 1, further including the step of generating the public modulus $N_{GM}$ for $G_M$ as a large prime number, the public exponent $e_{GM}$ is set to be equal to the public exponent of group G, $e_G$, and the plaintext maximum $MAX_{GM}$ is set to an integer less than the public modulus $N_{GM}$.

13. The method of claim 1, further including the step of generating the public key $P_{GM}$ and private key $PRIV_{GM}$ for group member $G_M$ such that the public modulus $N_{GM}$ is equal to a large prime number and the public exponent $e_{GM}$ is equal to the public exponent of group G, $e_G$, and the plaintext maximum $MAX_{GM}$ is set to an integer less than the public modulus $N_{GM}$ and the private exponent $d_{GM}$ has been generated using any method that produces a value that satisfies the relationship: $e_{GM} * d_{GM} = 1 \mod(N_{GM} - 1)$.

14. The method of claim 1, further including the step of decrypting ciphertext C by any member of group G, GM, by first generating CM using any method that produces a value equivalent to CM=C mod GM and then performing decryption on ciphertext CM using the private key of group member GM with standard RSA methods.

15. The method of claim 1, further including the step of decrypting the ciphertext C by any member of group G, GM, using the private key of group member GM with standard RSA methods.

16. The method of claim 1, further including the step of decrypting the ciphertext C by X members of group G, NGM1, NGM2, NGMx, collaborating together as:

$$M1 = CM1eG \bmod NGM1, CM1 = C \bmod NGM1$$

$$M2 = CM2eG \bmod NGM2, CM2 = C \bmod NGM2$$

$$\cdot$$
$$\cdot$$
$$\cdot$$

$$Mx = CMXeG \bmod NGMX, CMX = C \bmod NGMX$$

Where M1, M2, ... Mx are combined to generate M.

17. The method of claim 16, further including the step of combining $M_1, M_2, \ldots M_X$ to generate M using the Chinese Remainder Theorem or a variant of the Chinese Remainder Theorem.

18. The method of claim 1, further including the step of verifying a digitally signed message on behalf of group G using standard RSA methods and additionally including the following step to verify it as a valid group digital signature:
Ensuring that the following relationship holds between the public modulus of the digitally signed message NGM, the public exponent of the digitally signed message eGM, the public modulus of the group NG, and the public exponent of the group eG:
eGM=eG
0=NG mod NCM.

19. The method of claim 1, where one or more new members $G_{N1}, \ldots, G_{NK}$ can be added to group G using the following steps:
re-generating $N_G$ as the product of itself and $N_{GNP}$, where $N_{GNP}$ is the product of the public moduli of the public keys for $G_{N1}, \ldots, G_{NK}$, where $MAX_G$ is re-generated as the lower of the two values $MAX_G$ and $MAX_{GNP}$, where $MAX_{GNP}$ is generated as the lowest of the plaintext maximum values $MAX_{GN1}, \ldots, MAX_{GNX}$:

$$N_{GNP} = N_{GN1} * \ldots N_{GNK}$$

$$N_G = N_G * N_{GNP}$$

$$MAX_{GNP} = MIN(MAX_{GN1}, \ldots, MAX_{GNX})$$

$$MAX_G = MIN(MAX_G, MAX_{GNP}).$$

20. The method of claim 19, further including the steps of generating $MIN_G$ and $MAX_G$ are in an arbitrary way such that certain members or combinations of members of group G are required to collaborate to decrypt messages that are encrypted to group G.

21. The method of claim 1, where one or more existing group $G_{R1}, \ldots, G_{RK}$ can be removed from group G using the following steps:
re-generating $N_G$ using any method that produces a value equivalent to the quotient of a division operation where $N_G$ is the dividend and $N_{GRP}$ is the divisor:

$$N_{GNP} = N_{GR1} * \ldots N_{GRK}$$

$$N_{GT} = N_G / N_{GRP}$$

$$N_G = N_{GT}.$$

22. The method of claim 21, further including the step of re-generating the plaintext maximum $MAX_G$ as the minimum value of the set of the plaintext maximums for the remaining members of group G $$MAX_G = MIN(MAX_{G1}, MAX_{G2} \ldots MAX_{GK})$$

where K is the number of members in group G.

23. The method of claim 21, further including the steps of generating $MIN_G$ and $MAX_G$ are in an arbitrary way such that certain members or combinations of members of group G are required to collaborate to decrypt messages that are encrypted to group G.

24. The method of claim 21, further including the step of preventing the removed members $G_{R1}, \ldots, G_{RK}$ from decrypting a ciphertext message C and current members of group G can continue to decrypt ciphertext message C with their existing private keys, where C was encrypted using the group public key before $G_{R1}, \ldots, G_{RK}$ were removed from the group, including the step of:
Transforming the ciphertext message C using any method that produces a value equivalent to the remainder of a division operation where $N_{GT}$ is the dividend and C is the divisor:

$$C = C \bmod N_{GT}.$$

* * * * *